Inventor:
John Lauterbach
by his Attorneys
Howson & Howson

April 18, 1939.  J. LAUTERBACH  2,155,316
MACHINE FOR MOLDING PLASTIC MATERIALS
Filed Aug. 18, 1936   9 Sheets-Sheet 5
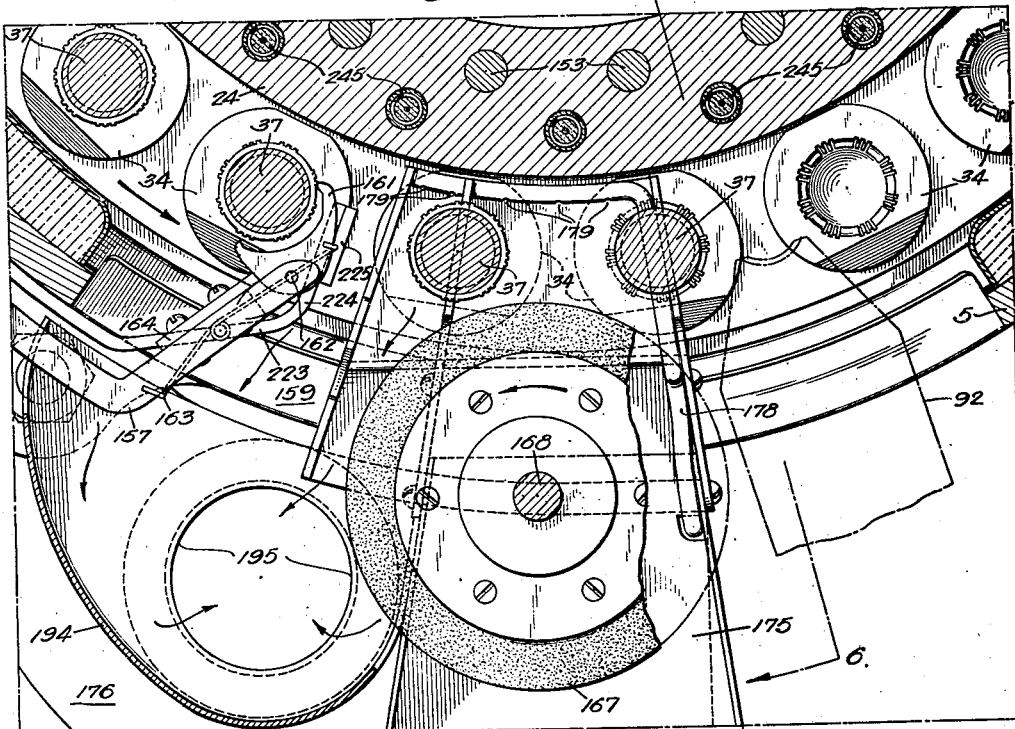
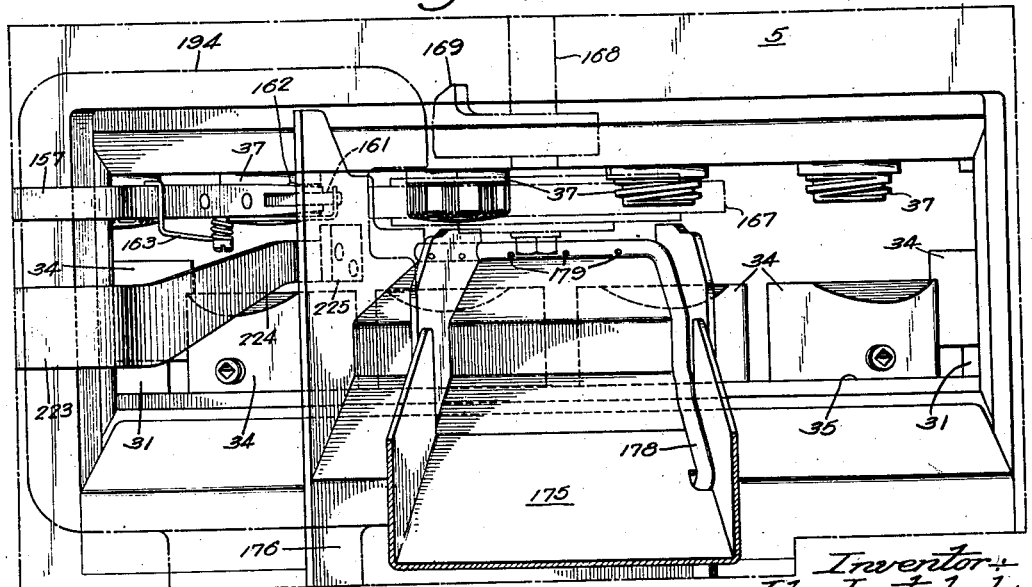
Inventor
John Lauterbach
by his Attorneys
Howson & Howson April 18, 1939. J. LAUTERBACH 2,155,316
MACHINE FOR MOLDING PLASTIC MATERIALS
Filed Aug. 18, 1936 9 Sheets-Sheet 6
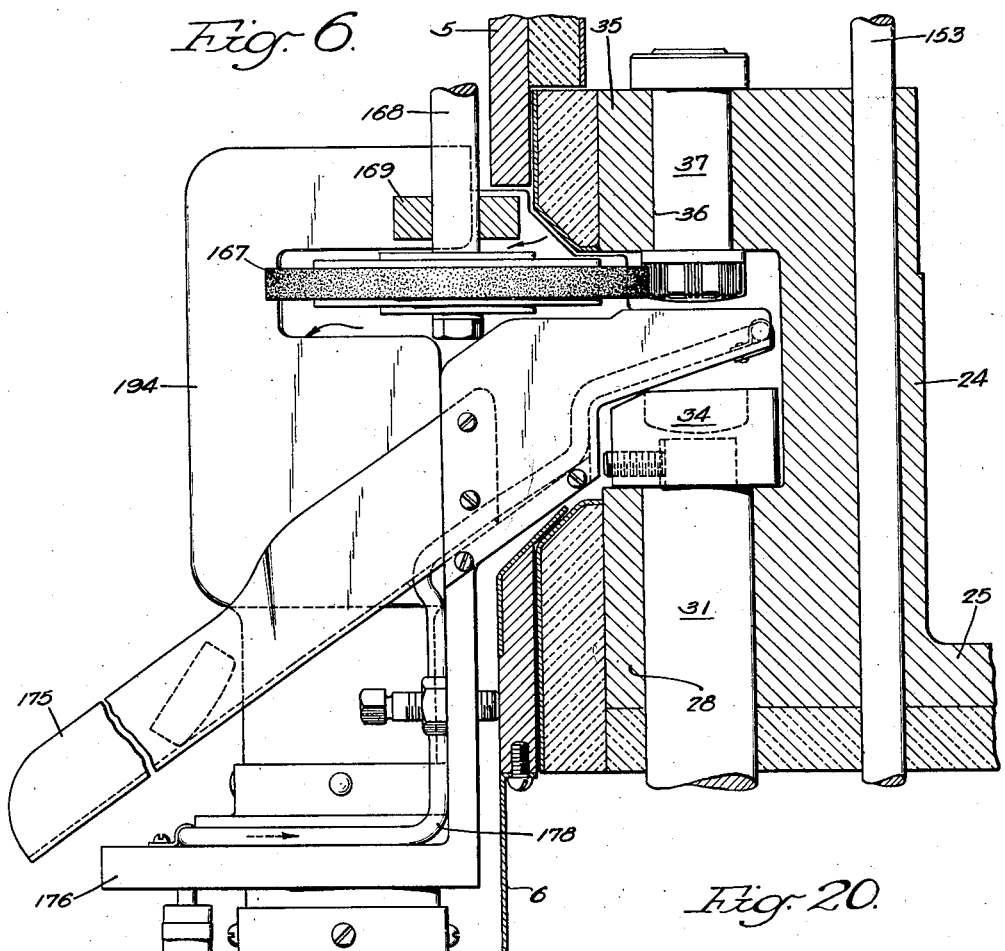
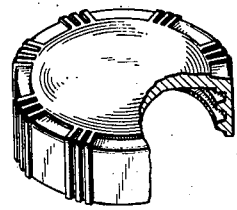
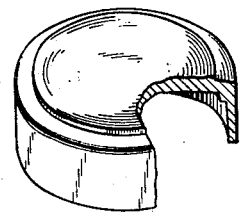
Inventor:
John Lauterbach
by his Attorneys
Howson & Howson April 18, 1939. J. LAUTERBACH 2,155,316
MACHINE FOR MOLDING PLASTIC MATERIALS
Filed Aug. 18, 1936   9 Sheets-Sheet 7
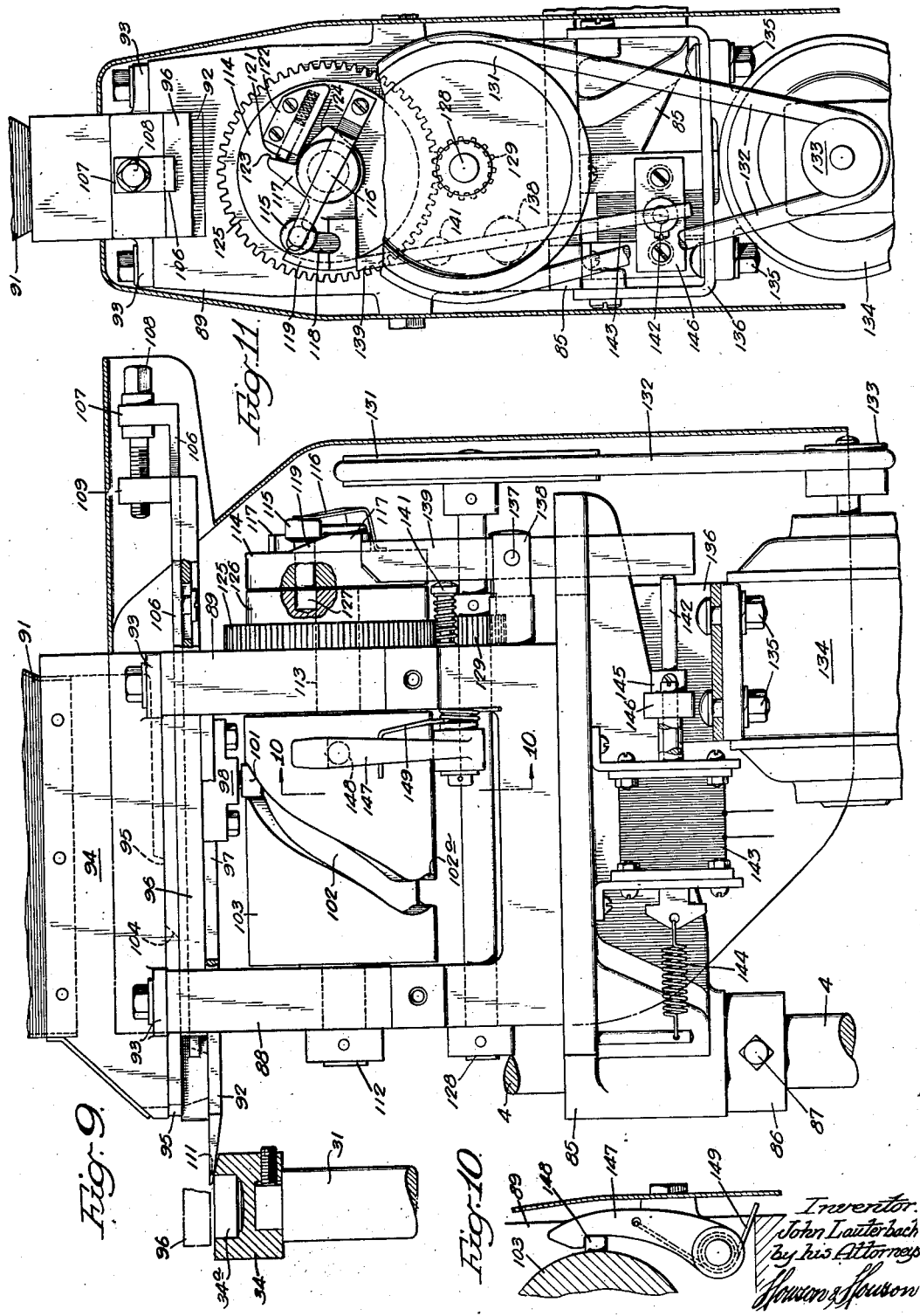
Inventor.
John Lauterbach
by his Attorneys
Howson & Howson April 18, 1939.    J. LAUTERBACH    2,155,316
MACHINE FOR MOLDING PLASTIC MATERIALS
Filed Aug. 18, 1936    9 Sheets-Sheet 8

Inventor:
John Lauterbach
by his Attorneys
Howson & Howson

April 18, 1939.  J. LAUTERBACH  2,155,316
MACHINE FOR MOLDING PLASTIC MATERIALS
Filed Aug. 18, 1936  9 Sheets-Sheet 9
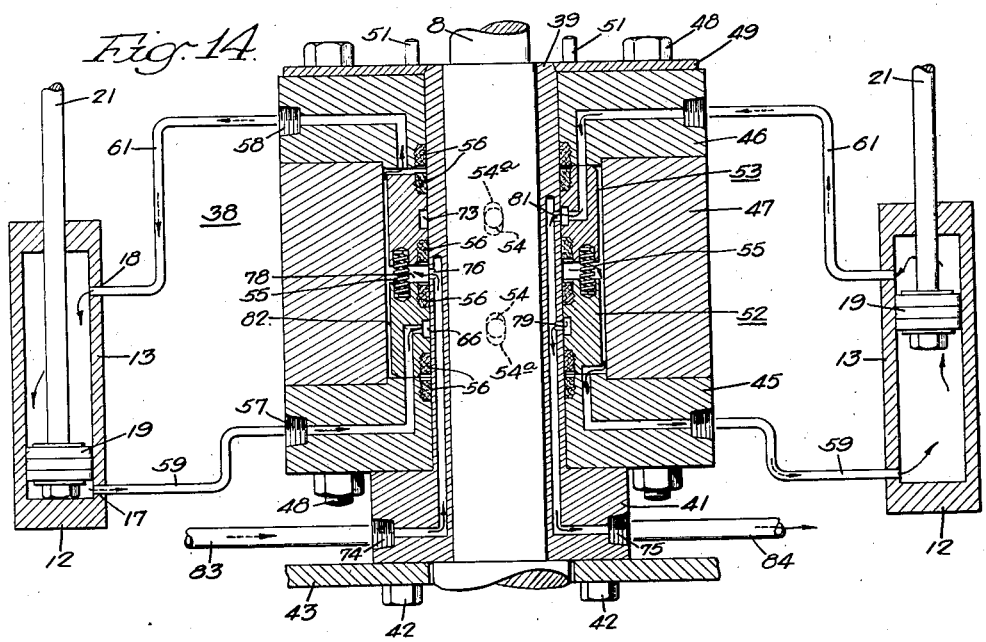
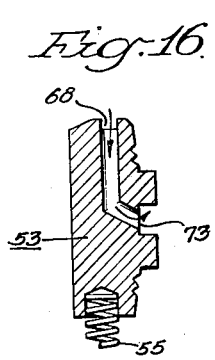
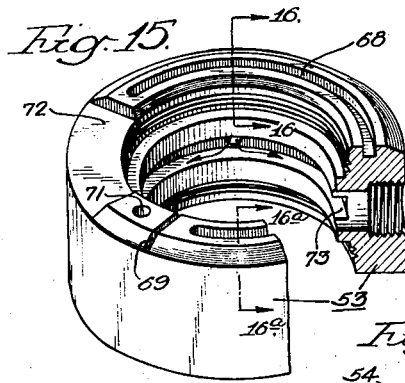
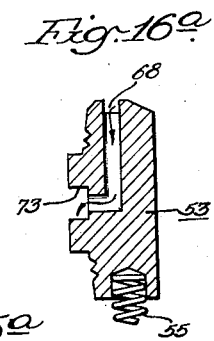
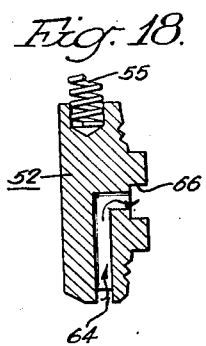
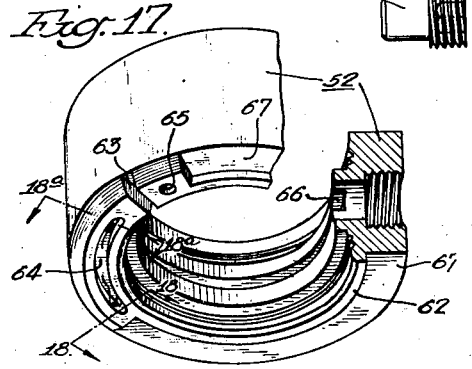
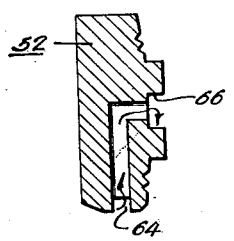
Inventor:
John Lauterbach
by his Attorneys
Howson & Howson Patented Apr. 18, 1939

2,155,316

UNITED STATES PATENT OFFICE 2,155,316

MACHINE FOR MOLDING PLASTIC MATERIALS

John Lauterbach, Philadelphia, Pa., assignor, by mesne assignments, to Lauterbach Corporation, Toledo, Ohio, a corporation of Delaware Application August 18, 1936, Serial No. 96,661

8 Claims. (Cl. 18—20)

This invention relates to improvements in machines for molding plastic materials and is a continuation in part of my copending application Serial Number 3,101, filed January 23, 1935.

A principal object of the invention is to provide an improved molding machine of the type wherein a plurality of molding units or dies are moved progressively and continuously through a predetermined cycle of operations, the molding material being fed to the dies at one point in the cycle, and the finished article being ejected and discharged from the machine as the die again approaches that point.

Another object of the invention is to provide a machine of the stated type wherein actuation of the individual dies is effected by hydraulic mechanism, and to this end, the invention contemplates the provision of a novel master valve unit through which the aforesaid hydraulic means and the operation of the dies may be regulated and controlled.

Still another object of the invention is to provide novel and highly efficient means for maintaining the dies during their cyclic operation at a predetermined temperature, said temperature being regulated to effect, in conjunction with applied pressure, a proper flow of the molding material in the dies and curing of the molded article.

A further object of the invention is to provide a molding machine of the type set forth that shall be characterized by exceptional compactness of form and simplicity of mechanical structure, and which may be operated economically.

A still further object of the invention is to provide a machine of the stated character that shall be completely automatic in operation.

To this latter end, a further object of the invention is to provide novel and improved means for automatically feeding the molding composition to the dies.

To this same end, a still further object of the invention is to provide novel and efficient means for stripping the molded articles from the dies.

Still another object of the invention is to provide novel means for mounting certain of the exterior elements, such as the feeding mechanism so that they may be shifted from the operating to extended positions affording free access to the dies.

The invention further resides in certain structural features and mechanical details hereinafter described and illustrated in the attached drawings, wherein:

Fig. 2a is a fragmentary sectional plan view showing a detail of the drive mechanism;

Fig. 5 is a fragmentary enlarged sectional view on the line 5—5, Fig. 1;

Fig. 6 is a fragmentary sectional view on the line 6—6, Fig. 5;

Fig. 7 is a fragmentary enlarged front elevational view of that portion of the machine illustrated in Fig. 6;

Fig. 8 is an enlarged fragmentary sectional view illustrating details of the stripper mechanism;

Fig. 9 is a fragmentary elevational view illustrating details of the charging mechanism;

Fig. 10 is a section on the line 10—10, Fig. 9;

Fig. 11 is an end elevational view of the mechanism illustrated in Fig. 9;

Fig. 14 is a vertical sectional view through the master valve unit;

Fig. 15 is a perspective and partial sectional view of one of the valve units;

Fig. 15a is a detached view of one of the key pins constituting an element of the valve structure;

Fig. 16 is a section on the line 16—16, Fig. 15;

Fig. 16a is a section on the line 16a—16a, Fig. 15;

Fig. 17 is a view in perspective of another of the valve elements;

Fig. 18 is a section on the line 18—18, Fig. 17;

Fig. 18a is a section on the line 18a—18a, Fig. 17;

Fig. 19 is a sectional view on the line 19—19, Fig. 1, and

Figs. 20 and 21 are perspective and partial sectional views showing one form of the finished product of the machine.

Figure 1:
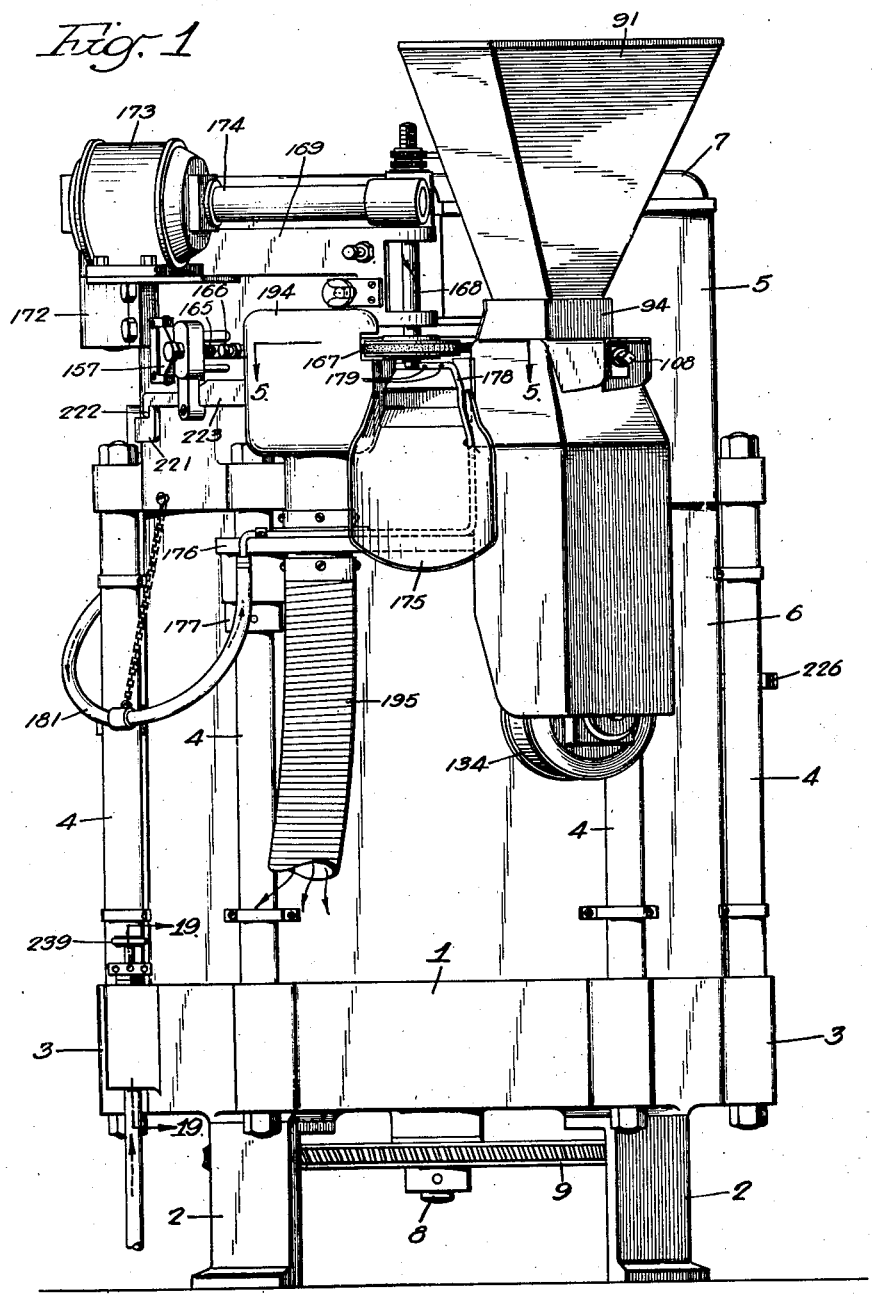
Figure 1 is a front elevational view of a machine made in accordance with my invention.
Figure 3:
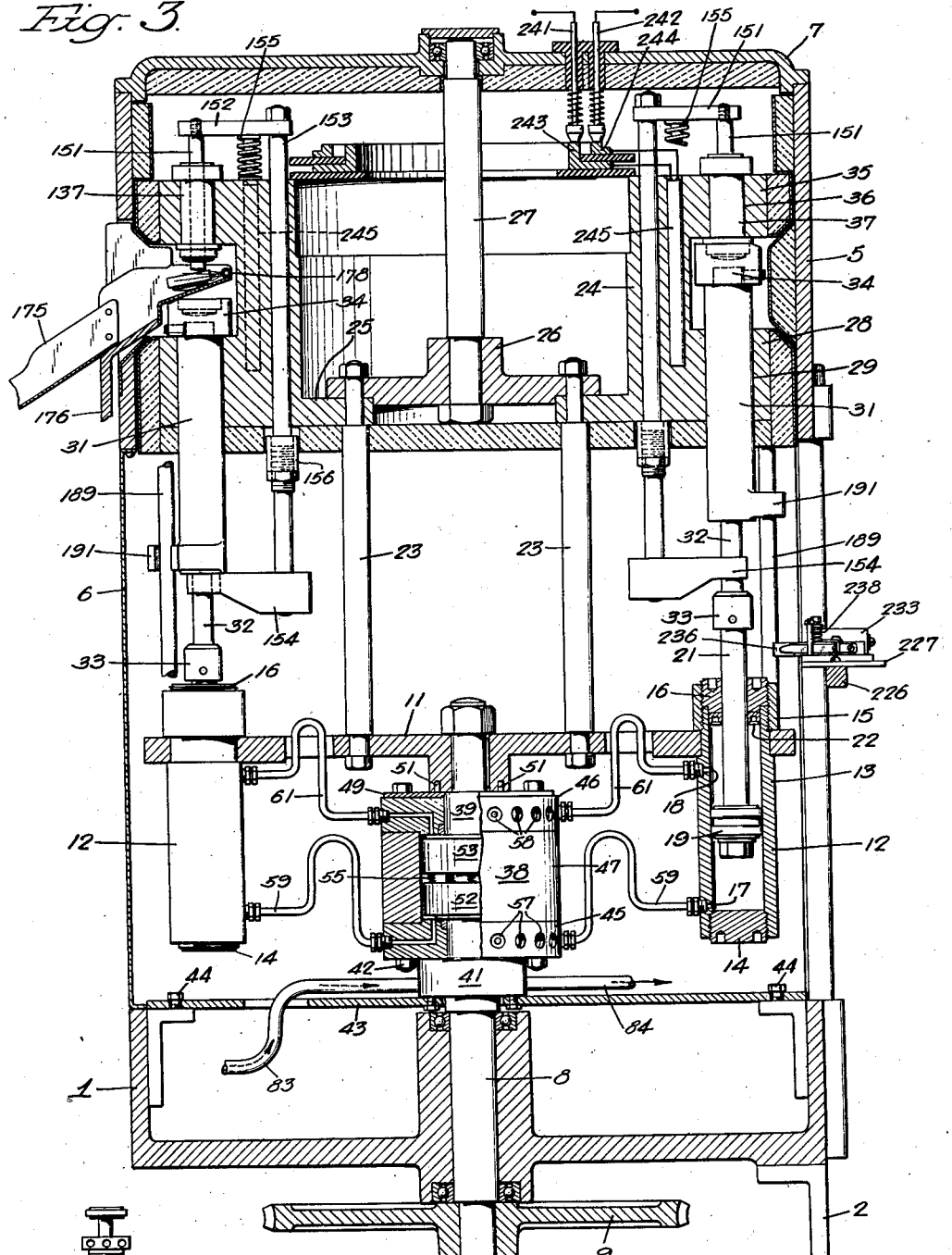
Fig. 3 is a section on the line 3—3, Fig. 2.
Figure 4:
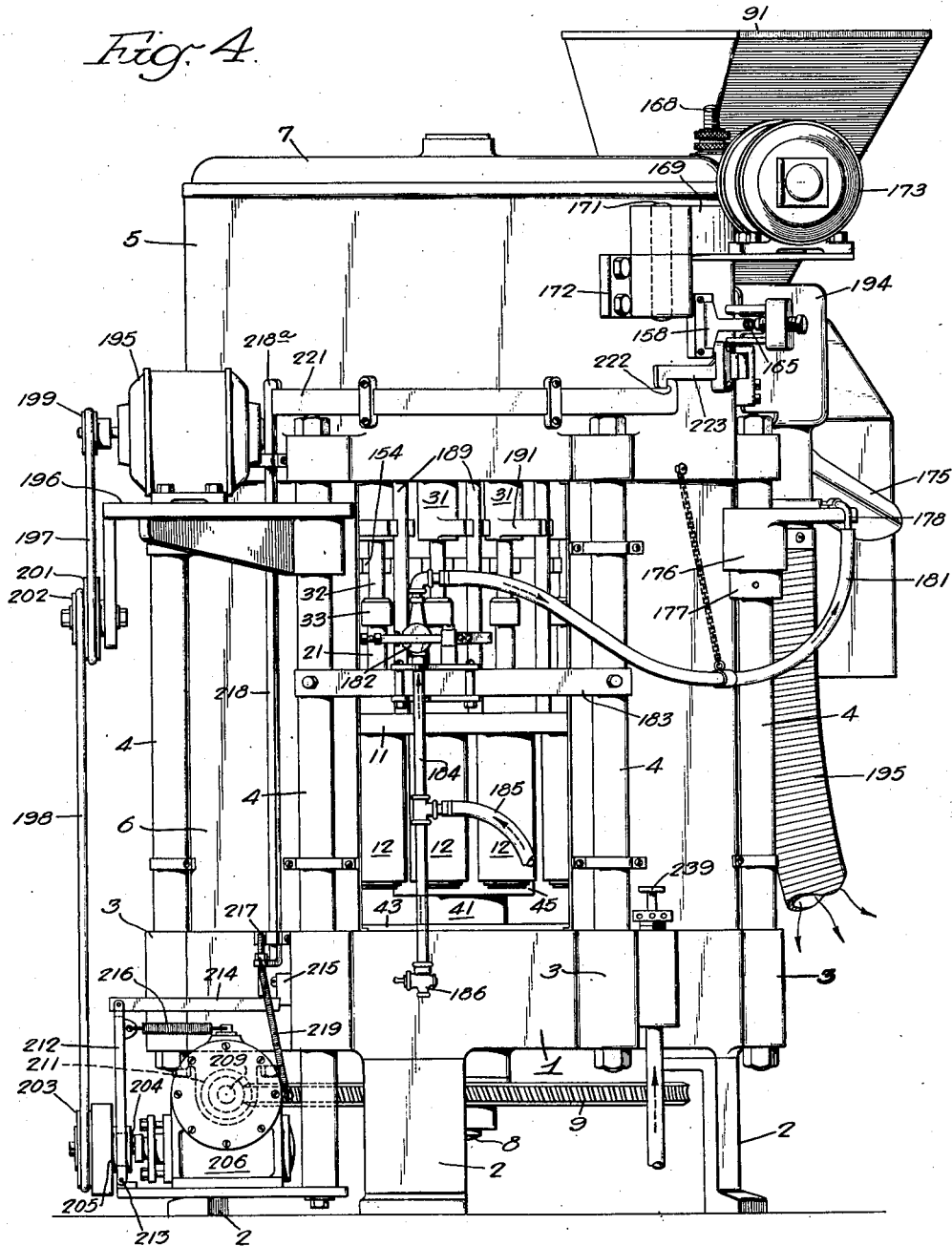
Fig. 4 is an elevational view from a position indicated by the line 4—4, Fig. 2.

With reference to Figs. 1, 3 and 4 of the drawings, the embodiment of the molding machine therein illustrated comprises a base member 1 supported upon legs 2. The base member 1 has at its periphery bosses 3 in which are secured vertical tie rods 4 which constitute a support for an upper housing 5. Between the base 1 and the housing 5 is a casing 6 which partially embraces the intervening space and which with the housing 5 forms a chamber for the moving parts of the mechanism. As illustrated, the housing 5 comprises a cover plate 7.

Journaled in the central part of the base 1 is a vertical shaft 8 which carries at its lower end a worm wheel 9. To the upper end of this shaft is secured a flange 11 which carries in the peripheral portion thereof an annular series of hydraulic cylinders 12. As shown in Fig. 3, each of these cylinders comprises a main cylindrical section 13 which is closed at the bottom by a threaded plug 14 and which is supported in the flange 11 by means of a threaded sleeve 15, this sleeve also receiving a threaded plug 16 which closes the upper end of the cylinder. Each of these cylinders is provided at the lower end with a port 17 and toward the upper end with a port 18, for admission and discharge of an actuating fluid respectively. In each of the cylinders is a hydraulic piston 19 having a piston rod 21 which extends upwardly through the plug 16, and the usual cup packing 22 is provided at the inner end of the plug 16 to prevent escape of fluid past the piston rod.

Supported on the flange 11 by means of tie rods 23 is a rotary head or drum 24, said head having at its lower end an inwardly projecting flange 25 through which the said tie rods extend. The flange 25 constitutes a support for a member 26 which is secured to the flange 25 by the tie rods 23 and which constitutes a support for a shaft section 27 which extends upwardly through the head 24 and is journaled at its upper end in anti-friction bearings in the cover plate 7 of the housing 5. The head 24 also comprises a radial flange 28 having a series of vertical bores 29 corresponding in number and in vertical alignment with the cylinders 12, and in each of these bores is slidably supported a cylindrical member 31 having at its lower end an extension 32 of reduced diameter which is joined by means of a suitable sleeve coupling 33 with the piston rod 21 of the aligned hydraulic cylinder 12. Detachably mounted at the upper end of each of the members 31 is a die element 34. The head 24 also has at its upper end an outwardly projecting radial flange 35 having a circumferential series of cylindrical openings 36 aligned respectively with the bores 29 of the underlying flange 28, and each of the openings 36 carries a die element 37 designed to cooperate with the aligned die element 34 supported as previously described upon the members 31.

Embracing the shaft 8 immediately below the flange 11 is a master valve unit designated generally by the reference numeral 38. As shown in Figs. 3 and 14, this valve unit comprises a central sleeve 39 which embraces the shaft 8 and which through its lower enlarged portion 41 is secured by means of stud bolts 42 to a plate 43, this plate in turn being secured by bolts 44 to the base 1. The bolts 44 pass through concentric arcuate slots in the plate 43, which provides for adjustment in a circumferential direction of the sleeve 39 upon the shaft 8. Embracing the sleeve 39 is a housing consisting of a lower section 45, which is supported upon the lower extended end 41 of the sleeve and which closely embraces the latter; a corresponding upper section 46; and an intermediate section 47, these three sections being secured together by bolts 48. Secured against the upper surface of the upper section 46 of this housing is a plate 49 having upwardly projecting pins 51, which pins as shown in Fig. 3 enter recesses in the sub-portion of the flange 11 and thereby immobilize the housing 45—46—47 with respect to this flange. Within the space between the intermediate section 47 of the valve housing and the sleeve 39 is a pair of annular valve elements 52 and 53, each of these elements closely embracing the sleeve 39 and being keyed thereto, as indicated at 54 in Fig. 14. The element 52 rests upon the housing element 45, and by means of springs 55 interposed between the elements 52 and 53, the latter element is forced upwardly into engagement with the under side of the housing element 46. Suitable packing is provided as indicated at 56 to prevent leakage of fluid between the sleeve 39, the housing members 45 and 46 and the valve elements 52 and 53.

It will be apparent from the foregoing description that the sleeve 39 being secured to the base 1 through the medium of the plate 43 remains stationary, as also do the valve elements 52 and 53 which are secured by the keys 54 to the sleeve, these keys being in the form of pins (see Fig. 15a) which are threaded into the elements 52 and 53 and project into slots 54a in the sleeve 39. The housing 45—46—47, however, is secured to the flange 11, and through the flange 11 with the shaft 8 with which, therefore, the housing rotates. It will be apparent also that the head 24, the die elements supported therein, the pressure cylinders 12 and the housing elements of the master valve 38 rotate with the shaft 8 as a unit.

In the outer faces of each of the valve housing elements 45 and 46 is a series of ports, 57 and 58 respectively, the ports of each series corresponding in number with the cylinders 12. The ports 57 of the housing element 45 are respectively connected through pipes 59 to the ports 17 of the cylinders 12; and the ports 58 of the housing element 46 are similarly connected through pipes 61 with the cylinder ports 18. Each of the ports 57 extends inwardly of the element 45 in the radial direction and upwardly to the surface contacted by the valve element 52. Each of the ports 58 extends radially inwardly in the housing element 46 and downwardly to the surface of that element contacted by the valve element 53. The lower end surface of the valve element 52, as shown in Fig. 17, is provided with a flange 62 which extends continuously around the inner periphery of the valve element with the exception of a narrow radial slot indicated by the reference numeral 63. At each side of this slot the flange 62 is widened toward the outer periphery of the valve element, and these widened sections are provided respectively with an elongated port 64 and a circular port 65. The arrangement is such that as the valve housing 45—46—47 rotates, the ports 57 are brought consecutively and successively into communication with the port 64, the slot 63, the port 65, and the recessed space 67 between the flange 62 and the outer periphery of the valve element. The port 64 extends upwardly through the body of the valve element 52, see Fig. 18, and communicates at its inner end with an annular recess 66 formed in the inner surface of the valve element 52. The port 65 is similarly connected at its inner end with the recess 66.

The upper end surface of the valve element 53, as shown in Fig. 15, which bears against the valve housing element 46 as previously described, is provided with an elongated port 68, a transverse slot 69, a port 71, and a recess 72, with which as the valve housing rotates the ports 58 of the housing element 46 are brought consecutively and successively into communication. As shown in Fig. 16, the port 68 communicates with an annular recess 73 in the inner surface of the valve element 53, and the port 71 similarly communicates with this recess. The port 68 has a circumferential extent corresponding with the circumferential extent of the recess 67 of the valve element 52. The recess 72 of the valve element 53 corresponds in length with the port 64 of the valve element 52, and the valve elements 52 and 53 are so relatively arranged, as shown in Figs. 15 and 17, that when one of the ports 58 is in communication with the recess 72 of the element 53, the interrelated port 57 is in communication with the port 64. A similar positional relation exists between the port 68 of the element 53 and the recess 67 of the element 52, and between the slot 69 and port 71 of the element 53 and the port 65 and slot 63 of the element 52, respectively. It will be apparent, therefore, that when any one of the ports 57 is in communication with the port 64 of the valve element 52, its companion port 58, i. e., that one of the ports 58 which is connected to the same pressure cylinder 13, is in communication with the recess 72 of the valve element 53. Similarly when any one of the ports 57 is in communication with the slot 63 of the valve element 52, its companion port 58 will be in communication with the port 71 of the valve element 53. When any one of the ports 57 is in communication with the port 65 of the valve element 52, its companion port 58 will be in communication with the slot 69 of the valve element 53; and when any one of the ports 57 is in communication with the recess 67 of the valve element 52, its companion port 58 will communicate with the port 68 of the valve element 53.

As illustrated in Fig. 14, the sleeve 39 is provided with a pair of ports 74 and 75 which extend inwardly from opposite sides of the lower end of the sleeve respectively. The port 74 extends upwardly through the sleeve and communicates at 76 with the space 78 between the valve elements 52 and 53. The port 75 also extends upwardly through the sleeve 39 and communicates at 79 and 81 respectively with the annular recesses 66 and 73 of the valve elements 52 and 53. Thus the port 74 is in continuous communication with the space 78 between the valve elements 52 and 53, and the port 75 is in continuous communication with the annular recesses 66 and 73 of the said valve elements. Also as shown in Fig. 14, the valve elements 52 and 53 are of lesser diameter than the interior diameter of the housing member 47 so that an annular space 82 is formed between the valve elements and the housing member which communicates with the space 78 between the valve elements and also with the recesses 67 and 72 of the valve elements 52 and 53 and with the slots 63 and 69 of these elements. When, therefore, any one of the ports 57 is in communication with the slot 63 or recess 67 of the valve element 52, that port 57 is also necessarily in communication with the space 78 between the valve elements 52 and 53 and with the port 74. Similarly when any one of the ports 58 is in communication with the slot 69 or recess 72 of the valve element 53, that port is also necessarily connected with the space 78 and with the port 74. Since the port 74 is connected through a pipe 83 with a source of fluid pressure (not shown), it will be apparent that when any one of the ports 57 communicates with the slot 63 or recess 67 of the valve element 52, fluid pressure will be admitted to the lower end of the pressure cylinder connected with that port; and when any one of the ports 58 communicates with the slot 69 or recess 72 of the valve element 53, fluid pressure will be admitted to the upper end of that one of the cylinders connected to that port. Since, as previously set forth, when any one of the ports 57 is connected with the slot 63 or recess 67 of the valve element 52, its companion port 58 is in communication with the port 71 or port 68 of the valve element 53, it will be apparent that when pressure is admitted to the lower end of any one of the cylinders 13, the upper end of that cylinder will be connected with the port 75, which through a pipe 84 is connected with the exhaust. Under these circumstances, therefore, the fluid pressure entering the lower end of the cylinder 13 will force the contained piston 19, upwardly, carrying with it the associated die element 34. When on the other hand any one of the ports 58 is connected with the slot 69 or recess 72 of the valve element 53, the reverse connection between the pressure and exhaust ports and the cylinder ports 57 and 58 will have been made, with the result that fluid pressure then admitted to the upper end of the cylinder will force the piston 19 downwardly to the normal depressed position, carrying with it to the normal depressed position the associated die element 34. In one complete revolution of the machine, therefore, the port 57 of each of the cylinders 13, starting for example in communication with the port 64 of the valve element 52, at which time the piston will be in the depressed position, will move successively into contact with the slot 63, the port 65 and the recess 67. When the port communicates with the slot 63, pressure is admitted as previously described to the bottom of the cylinder so that the piston is forced upwardly. This movement of the piston, depending on the speed of rotation and the width of the slot 63, may elevate the associated die element 34 to the maximum extent completely closing the die, or to a lesser extent partially closing the die. Assuming that the closing of the die is completed when the port 57 communicates with the slot 63, it will be apparent that when the port 57 moves into contact with the port 65 of the valve element 52, there will be a momentary separation of the die parts, or, in the event that the die is not completely closed, at least a momentary interruption in the upward movement, permitting the gases to escape from the die and thereby avoiding defects in the molded product arising from a trapping of the gases in the die that otherwise might occur. Subsequently when the port 57 moves into communication with the recess 67 of the die element 52, the die elements will be completely closed, and will remain closed with the pressure applied in the bottom of the associated cylinder 13 during the remaining portion of the rotational movement and until the port 57 again is brought into communication with the port 64, at which time the piston 19 will be forced downwardly in the cylinder and will open the die. Preferably the ports are so relatively arranged that the power strokes which respectively close and open the dies and which occur at opposite sides of the machine will not be simultaneously initiated.

Figure 2:
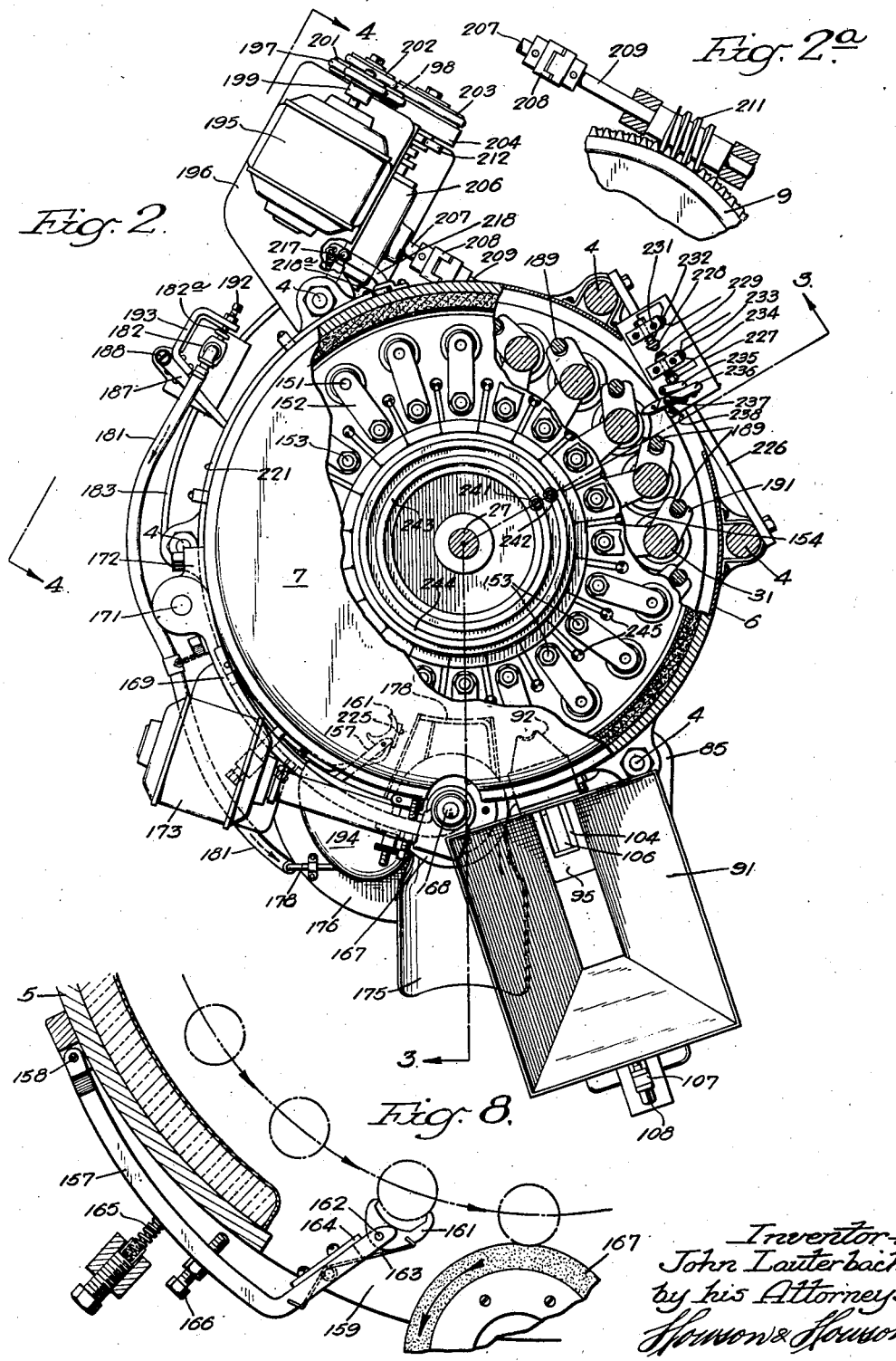
Fig. 2 is a plan and partial sectional view of the machine.
Figure 12:
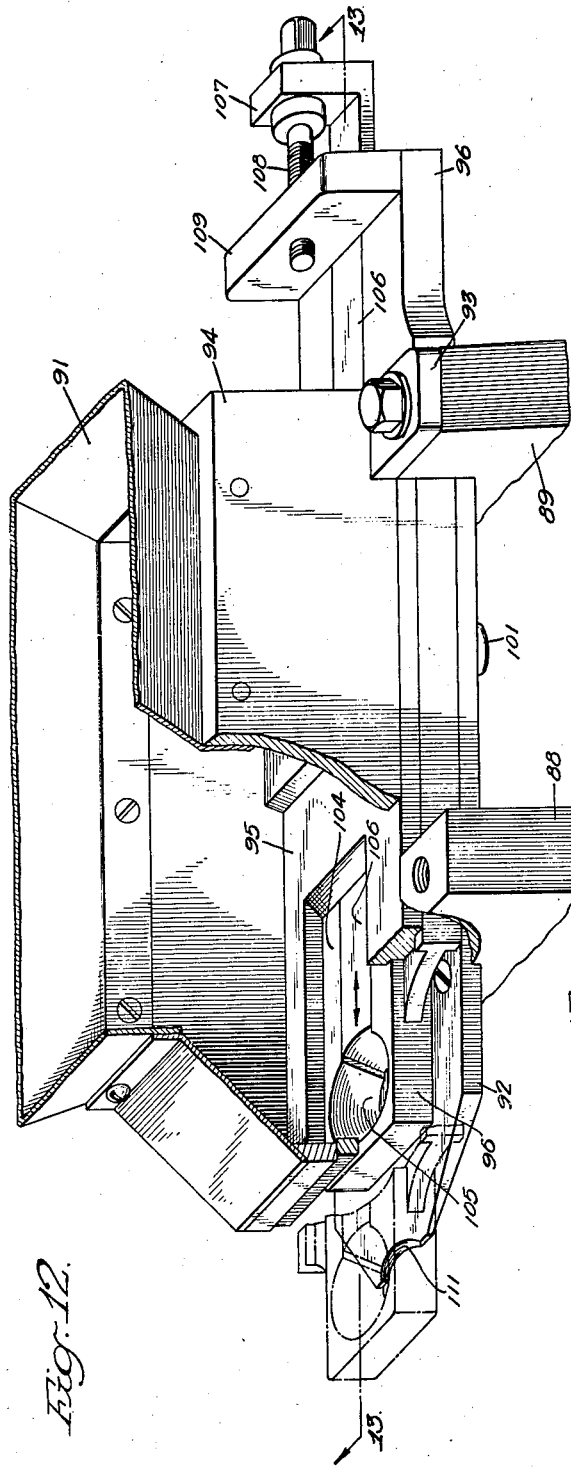
Fig. 12 is a detached view in perspective of the charging unit.
Figure 13:
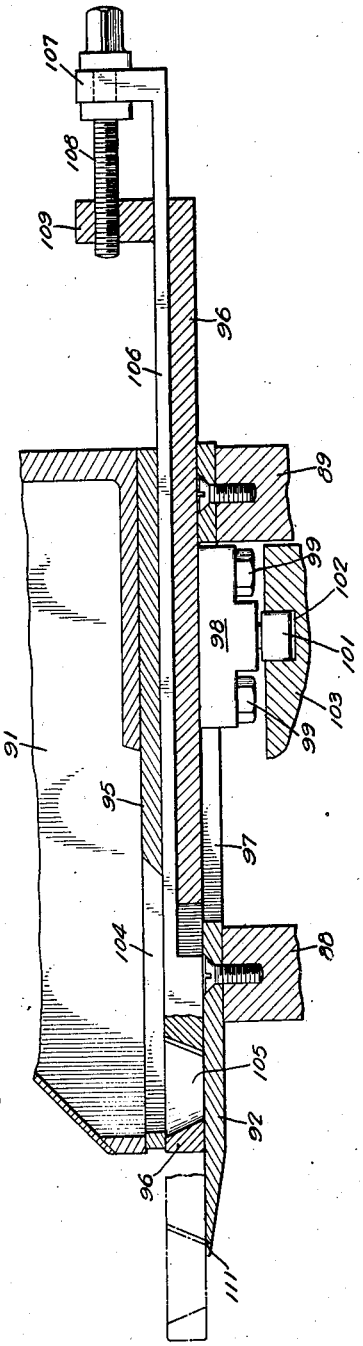
Fig. 13 is a section on the line 13—13, Fig. 12.

Means is provided at the beginning of the cyclic movement of each die as described above for automatically feeding to the female die member 34 the predetermined measured quantity of the molding material required to form the finished product. This device is illustrated in detail in Figs. 9 to 13, inclusive, and in Figs. 1 and 2. The feeding device is mounted as a unit on a bracket 85 which, as shown in Figs. 2 and 9, is pivotally mounted upon one of the tie rods 4 through the medium of a supporting collar 86 secured to the tie rod by a set screw 87. The bracket 85 comprises upstanding parallel plates 88 and 89 upon the top of which is supported a hopper structure 91. The hopper structure comprises a base plate 92 which as shown in Figs. 12 and 13 is mounted in a recess at the upper ends of the plates 88 and 89; and the hopper proper is mounted above and in spaced relation to the plate 92 by means of lugs 93 which project from the sides of the base member 94 of the hopper and seat upon the extreme upper ends of the said plates 88 and 89. Intermediate the floor 95 of the hopper and the plate 92 and closely confined therebetween is a slide 96. As shown in Fig. 13, the plate 92 is cut out at 97 in the area between the plates 88 and 89, and through this cutout depends a bracket 98 which is secured by bolts 99 to the under side of the slide plate 96 and which carries at its lower end a cam roller 101, this roller fitting in the groove 102 of a cylinder cam 103 which is journaled, see Fig. 9, in the side plates 88 and 89. Rotation of the cam 103 has the effect with the aforedescribed arrangement of longitudinally reciprocating the slide plate 96 between the base plate 92 and the floor 95 of the hopper.

As shown in Figs. 12 and 13, the said floor 95 has therein an opening 104, and this opening 104 registers, when the slide plate 96 is retracted as shown, with a tapered port 105 in the slide plate 96. The slide plate 96 comprises an adjustable insert 106 the forward end of which terminates in and forms a part of the wall of the port 105. The rear end of the insert 106 has an upstanding flange 107 which carries loosely mounted therein for rotation a bolt 108 threaded into an upstanding flange 109 at the rear end of the slide plate 96. The arrangement is such that through adjustment of the screw 108 the position of the insert 106 in the slide plate 96 can be varied to thereby vary and to accurately regulate the effective volumetric capacity of the port 105.

When the feeding device is in the operative position as shown in Fig. 9, the forward edge of the base plate 92 occupies a position of alignment with the cavities 34a of the female die elements 34 as the latter move in their circular path, the said forward edge of the base plate 92 being provided with an arcuate recess 111 which conforms to the circumference of the cavity 34a. Assuming that the hopper 91 contains a comminuted molding composition, it will be apparent that when the slide plate 96 is retracted as shown in Fig. 12, this material will fall by gravity into and will fill the port 105 of the plate, and that when the slide plate 96 is subsequently advanced, the measured quantity of this material filling the port 105 will be carried out of the hopper and will eventually be deposited in the cavity 34a of one of the dies 34 by movement of the port 105 of the plate 96 beyond the terminal edge of the base plate 92 and into a position directly above the said cavity.

As shown in Fig. 9, the cylinder cam 103 has trunnions 112 and 113 journaled respectively in the plates 88 and 89. Secured to the outer end of the trunnion 113 is a disk 114 having therein an aperture in which is loosely mounted a pin 115. A leaf spring 116 engages the outer end of the pin 115 and urges it resiliently inwardly. At the outer side of the disk 114 and pivotally mounted thereon in concentric position is a pin retractor cam 117 having a slot 118 for reception of the pin 115, those portions of the cam at the sides of said slot being tapered as shown at 119 in Fig. 9 so that when by reason of relative movement between the disk 114 and the cam 117 the pin 115 moves into the slot 118, these inclined surfaces 119 will have the effect of retracting the pin against the tension of the spring 116 to a position as shown in Fig. 9. The cam 117 is urged away from the pin-engaging position by means of a spring-pressed pin 121 supported in a keeper 122 secured to the face of the disk 114, and this keeper also tends by cooperation with the surfaces 123 and 124 of the cam element 117 to limit the movement of this cam element with respect to the disk 114.

Loosely mounted upon the trunnion 113 of the cylinder cam 103 is a gear 125 having a hub portion 126 containing in its outer face an aperture 127 adapted for reception of the pin 115. When the pin is advanced by the spring 116 and enters the aperture 127, the gear 125 will thereby be immobilized with respect to the trunnion 113. Journaled in the plates 88 and 89 of the bracket 85 is a shaft 128 which carries a pinion 129 meshing with the gear 125, and the shaft 128 carries at its outer end a pulley wheel 131 which is connected through a belt 132 with a pulley 133 carried by the shaft of an electric motor 134. This motor as shown in Figs. 9 and 11 is secured by means of bolts 135 to the under side of a strap 136 suspended from the bracket 85. Pivotally mounted at 137 upon a stud 138 projecting from the lower portion of the plate 89 is a rod 139 the upper end of which, as shown in Figs. 9 and 11, normally occupies a position in the path of the cam element 117. When so positioned, the rod 139 prevents rotation of the cam 117 with the disk 114. Assuming under these conditions that the pin 115 is advanced and engaged in the aperture 127 of the gear hub 126 and that the gear 125 is being driven from the motor 134 by the interconnecting elements, it will be apparent that when the cam 117 engages the upper end of the rod 139 as shown in Fig. 11 the continued rotation of the disk 114 will effect through the action of the cam surfaces 119 a retraction of the pin 115, disconnecting the gear 125 from the trunnion 113.

Means is provided for adjusting the rod 139 to and from its operative position with respect to the cam 117. A spring-pressed pin 141 bears against the rod 39 at a point above the pivot 137 and tends to hold the rod in the operative position, as shown in the drawings. Adapted to operate against the rod 139 at a point below the pivot but on the same side as the pin 141 is a core rod 142 of a solenoid 143. The rear end of the rod 142 is engaged by a coiled spring 144 the other end of which is suitably connected with the bracket, and this spring normally holds the plunger rod 142 in a retracted position, as shown in Fig. 9, this position being determined by a collar 145 secured to the rod which engages the forward face of a stop plate 146. The rod 142 thereby constitutes a stop for the lower end of the rod 139, against which the latter rod bears when in the normal position as illustrated. When the solenoid is energized, the plunger rod 142 is projected sufficiently to swing the rod 139 around its pivot 137 to an extent clearing the upper edge of the rod from the cam 117. When the cam 117 is released in this manner from the rod 139, the cam is shifted in a clockwise direction, as seen in Fig. 11, by means of the spring-pressed pin 121 and with respect to the disk 114 to an extent permitting the pin 115 to enter the recess 127 in the hub portion 126. The gear 125 then carries the disk 114 and with it the cylinder cam 103 through one complete revolution, at the end of which the rod 139, which in the meantime has been released by deenergization of the solenoid 143 and has been moved by the spring pin 141 to the normal operative position, by reengagement with the cam 117 causes the latter to withdraw the pin 115 from the recess 127. In this movement, the cylinder cam 103 has also moved through one complete revolution, and in order to prevent a backward movement of this cam by action of the spring-pressed pin 121, I provide a latch 147 the hooked end of which is adapted to engage a boss 148 projecting from the cylindrical surface of the cam, as shown in Fig. 10, this latch being resiliently held in the operative position, as shown, by means of a spring 149.

The timing of this feeding device is synchronized with the rotational movement of the die block or head 24, so that as each one of the dies 34 moves into aligned position with the base plate 92, the slide plate 96 will be advanced to an extent depositing the predetermined measured quantity of the molding material withdrawn from the hopper as described into the die. In this connection, attention is directed to the form of the cam slot 102, as shown in Fig. 9. In one revolution of this cam, the feed plate 96 is fully advanced to a position in which the opening 105 overlies the cavity 34a of the female die. It is then retracted to a small extent and again advanced to the extreme position by means of a jogging action effected by the notch in the cam slot 102 indicated in Fig. 9 at 102a. This gives a jogging movement to the feed plate 96 at the forward end of its stroke, dislodging all of the molding material which might otherwise tend to adhere to the walls of the port 105 and insuring an accurate deposition of the exactly measured quantity of the material in the cavity 34a.

It will be noted that by reason of the pivotal mounting of the bracket 85 as described above, the entire feed unit may be swung away from the normal operative position in which it is shown and toward the right as viewed in Fig. 2, thereby affording access to the interior of the housing 5 at that point.

By reference to Fig. 3, it will be noted that each of the male die elements 37 is provided with a longitudinal bore in which is slidably mounted a pin 151. In the normal elevated position of this pin shown at the right of Fig. 3, the lower end thereof forms a part of the effective bottom surface of the male die element. In a depressed position of the pin 151, as shown at the left in Fig. 3, this pin projects below the bottom normal surface of the male die element and constitutes an ejector for dislodging the molded article which adheres to the relatively fixed male die when the female die element 34 has been retracted to its normal depressed position. The pin 151 is secured at its upper end to a cross bar 152, which bar is secured at the upper end of a rod 153. The rod 153 extends downwardly through the die block 24 and carries at its lower end an arm 154 which extends transversely and loosely embraces the rod 32. A spring 155 exerts pressure on the arm 152 tending to hold the rod 153 in an elevated position determined by an adjustable stop sleeve 156 on the rod 153, this sleeve in the elevated position of the rod engaging the under side of the die block 24. When the pistons 19 are elevated in their cylinders, the rod 153 is permitted by action of the spring 155 to assume its normal elevated position. When the pistons 19 are moved downwardly in their cylinders to lower the female dies 34, the members 31 engage the arms 154 and move the rods 153 downwardly as shown at the left in Fig. 3, thereby depressing the ejector pin 151. This type of ejector is adaptable for molded articles of the character for example shown in Fig. 21.

For articles of the character shown in Fig. 20, having internal threads, a different character of ejector or stripping device is employed, a device of this character being illustrated in Figs. 1 and 2, and 4 to 8, inclusive. In this instance, it is necessary to unthread the molded article from the threaded male die to which it adheres when the female die 34 is lowered. To this end, I provide an arm 157, see Fig. 8, which is pivotally mounted at 158 to the side of the housing 5 for horizontal movement. The free end of the arm 157 turns inwardly through an opening 159 in the front of the housing 5 and carries a fingered pawl 161 which is pivotally secured at 162 to the inner end of the arm, a spring 163 urging this pawl in one direction about the pivot. Pivotal movement of the pawl 161 under the actuation of the spring 163 is limited by a stop plate 164. The arm 157 is urged inwardly toward the housing 5 by a spring 165, and the inner position of the arm is determined by a set screw 166. The normal position of the arm 157 and pawl 161 is shown in Fig. 5, wherein it will be noted that the pawl lies directly in the path of the male die element and of the molded article which adheres thereto as previously described. As the die moves in its rotary path, the side of the molded article is engaged by the inner finger of the pawl 161 as illustrated, and the continued movement of the die has the effect of swinging the pawl so that the outer finger is brought inwardly against the side of the molded article. It is preferable to form the molded article with ribs or recesses on its outer surface that will provide a bearing for the fingers of the pawl 161 so that the latter may in effect grip the article. Still further advance movement of the dies causes a movement of the pawl 161 and of the arm 157 toward the position shown in Fig. 8, and in this movement the molded article is given a clockwise rotation, as viewed in Figs. 5 and 8, by the action of the pawl, thereby loosening the molded article on the threads of the male die element.

As the die advances further in its rotary path and frees the molded article from the pawl 161, the said article is engaged by a rotary disk 167 which is rotated at a relatively rapid rate in the direction indicated by the arrow in Fig. 5. The peripheral portion of the disk 167 is made of a flexible material, such for example as felt or rubber, and has the effect of rotating the already loosened molded article on the threaded male die to an extent stripping the article from the die. The disk 167 is carried at the lower end of a vertical shaft 168, see Fig. 1, which is supported in bearings in a bracket 169 which is pivotally mounted upon a pintle 171 supported in a bracket 172 secured to the housing 5, see Fig. 4. This bracket also carries an electric motor 173 which is connected to a shaft (not shown) extending through and journaled in a cylindrical housing 174. This latter shaft is connected by means of a worm and worm wheel (not shown) to the shaft 168, the motor 173 thereby constituting the means for rotating the disk 167.

Directly below the disk 167 is a chute 175 which is mounted on a bracket 176 pivotally supported upon one of the tie rods 4 by means of a collar 177, see Fig. 1. As shown in Fig. 6, the chute 175 extends upwardly and inwardly to a point below and in back of the line of travel of the dies so that when the molded article is stripped from the male die, the said article will fall by gravity into the chute to be discharged to the outside of the machine. In order to insure a prompt discharge of the molded article from the chute, I provide at the upper end of the latter a tube 178 which is connected to a source of air pressure and which has apertures 179 through which an air blast may be directed downwardly of the chute. The tube 178 extends downwardly to the bottom of the bracket 176 and is connected through a flexible tube 181, see Fig. 4, with a valve 182, which valve is supported in the present instance upon a cross bar 183 extending between and secured to two of the tie rods 4. From the valve 182 a tube 184 extends downwardly and is connected with a tube 185 extending to the source of air pressure. The lower end of the tube 184 is provided with a drain cock 186. The valve 182 is normally closed and is opened to admit compressed air to the tube 181 through the medium of a lever 187 which is pivotally mounted at 188 and projects inwardly into the path of an annular series of vertical rods 189 which constitute guides for the die-supporting members 31, see Figs. 2 and 3. As therein illustrated, each of the members 31 has a flange 191 extending transversely from the lower end thereof and notched at its outer end for sliding engagement with one of the rods 189. These rods are secured to and extend vertically between the plate 11 and the die block 24, and function to prevent rotary movement of the die-supporting members 31. As each of the rods 189 in their rotary movement with the die block 24 engages the inner end of the lever 187, the latter is swung on its pivot in a counter-clockwise direction, as viewed in Fig. 2, with the result that a set screw 192 in the outer end of an arm 193 secured to the arm 187, see Fig. 2, presses the valve stem 182a which it engages inwardly, thereby opening the valve. This periodic opening of the valve is in timed relation with the stripping action which deposits the molded articles in the chute 175, as previously described, and the effect of the blast of air passing from the ports 179 of the tube 178 is to force the molded article downwardly in the chute so that it may fall by gravity from the lower end of the latter. The bracket 176 which carries the chute 175 also supports a suction hood 194 the open side of which communicates with the upper end of the chute 175. This hood 194 is connected through a suitable duct 195 with a source of suction (not shown), which operates to withdraw the flashings removed from the molded article by the action of the disk 167. It will be noted that this latter function of the disk 167 leaves the molded article in a clean and finished condition so that no further operation is required after the molded article has left the machine.

The shaft 8 is rotated by an electric motor 195 which as shown in Figs. 2 and 4 is mounted upon a bracket 196 supported at the back of the machine upon two of the tie rods 4. This motor is connected through belts 197 and 198 and pulleys 199, 201, 202 and 203 with a shaft 204 at the bottom of the machine. The pulley 203 is detachably connected with the shaft 204 through a clutch 205. The shaft 204 carries a worm located in a housing 206 which meshes with a worm wheel on a shaft 207, this shaft being connected through a suitable coupling 208 with a shaft 209 which carries a worm 211 meshing with the worm wheel 9 at the bottom of the shaft 8. The clutch 205 is controlled by a clutch rod 212 which is pivotally mounted at 213 and extends upwardly, and has pivotally secured to its upper end a link 214. The outer end of this link is adapted to engage in a suitably formed notch in a block 215 secured to the base 1, as shown in Fig. 4, and when so engaged retains the clutch rod 212 in the clutch-engaging position as illustrated against the tension of a coiled spring 216 which exerts pressure tending to draw the clutch rod 212 into a position releasing the clutch 205 and thereby disconnecting the shaft 204 from the motor 195. Toward its outer end, the link 214 is engaged at the top by a pin 217 which is carried at the lower end of a slide rod 218 supported for vertical movement on the base 1 and housing 5. A spring 219 exerts pressure on the rod 218 tending to draw this rod downwardly, but is normally prevented by a bar 221 which is slidably supported for horizontal movement on the housing 5 and one end of which engages and supports the hooked upper end 218a of the rod 218, as shown in Fig. 4. When the slide bar 221 is moved to the right, as viewed in Fig. 4, to an extent releasing the hooked end 218a of the rod 218, the spring 219 draws this rod downwardly, thereby depressing the outer end of the link 214 and clearing this link from the stop block 215. The spring 216 then is permitted to draw the clutch rod 212 to the right, see Fig. 4, to disengage the clutch 205. The slide bar 221 is normally interlocked as indicated at 222 in Fig. 4 with a bar 223 which is slidably supported on the housing 5 and which as shown in Figs. 2, 5 and 7 extends around the side of the housing 5 and has an inturned end portion 224 which extends into the interior of the housing below the rod 157, the inner end of the rod 224 carrying a block 225 which occupies a position directly below the path of travel of the male dies 37 and directly in the path of the female die elements 34 when the latter are in the elevated position. As the dies approach the stripping position, the female die elements 34 have been carried downwardly to their depressed position, as shown in Fig. 7, so that as the die block rotates, these female elements 34 pass under the stop block 225. If, however, the female elements by reason of a defect in the operating mechanism have failed to move to the retracted or depressed position at this point, they will engage the stop block 225 and will force the bar 223 to the right, as viewed in Figs. 4, 5 and 7, with the result that the bar 221 is also moved to the right sufficiently to release the rod 218 as previously described and to thereby disconnect the motor 195 from the shaft 204, interrupting the movement of the die block. This automatically operating safety device prevents the damage that would otherwise occur, as for example by engagement of the female die elements with the upper end of the trough 175, were these female die elements not fully retracted as they move into the stripping position. It will be apparent that the operation of the machine may be similarly interrupted by manual depression of the free end of the link 214. It will be apparent from the foregoing description that in the operation of this machine and under normal conditions, the die block 24, the entire series of cylinders 12 and the movable elements of the valve 38 will rotate continuously and at a predetermined rate of speed.

The feed mechanism is actuated intermittently to charge each of the female die elements 34 as the latter move into alignment with the plate 92 with a measured quantity of the molding composition from the hopper 91. This intermittent actuation of the charging mechanism is effected as previously described through the solenoid 143 and through the means now to be described for intermittently energizing the solenoid.

With reference to Figs. 2 and 3, it will be noted that a transverse bar 226 is supported between two of the tie rods 4 and carries a plate 227 upon which is mounted a pair of electrical contacts or switch elements 228 and 229. The contact 228 is slidably mounted in a suitable bearing block 231 and is urged into an advanced position by means of a spring 232. The contact 229 is similarly slidably mounted in a block 233, and a spring 234 normally retains this contact in a retracted position and separated from the contact 228, all as shown in Fig. 2. A pivoted lever 235 on the plate engages the end of the contact 229, and in turn is engaged by a second lever 236 which is pivotally secured at 237 on the plate 227. A spring 238 tends to hold the outer end of the lever 236 against the free end of the lever 235, and the inner end of the lever 236 lies in the path of the series of rods 189. As the die block rotates and with it the rods 189, the latter successively engage the lever 236 and swing the outer end of the lever away from the lever 235. When the inner end of the lever 236 is released by the rod 189, the spring 238 acts to swing the outer end of the lever 236 sharply against the lever 235, which drives the contact 229 inwardly against the contact 228, thereby closing the electric circuit of which these contacts form a part. This electric circuit includes, in addition to a source of electrical energy, the solenoid 143, so that when the circuit is closed as described, the solenoid is energized, thereby forcing the rod 142 outwardly and oscillating the lever 139 to an extent freeing the cam 117. When thus freed, the cam is moved away from the pin 115, which is thereby permitted to enter the recess 127 in the hub 126 of the gear 125, connecting the cylinder cam 103 with the motor 134 as previously described. Since after energization the solenoid 143 is immediately deenergized through separation by the spring 234 of the contacts 228 and 229, the stop bar 139 is immediately permitted to return under operation of the spring-pressed pin 141 to a position in the path of the cam 117, so that after one complete revolution of the cylinder cam 103, the cam 117 functions again to retract the pin 115 and thereby brings the cylinder cam 103 to a standstill. One complete revolution of the cylinder cam 103 causes a projection of the slide plate 96 of the charging mechanism and a retraction of this plate to its original position, as shown in Figs. 12 and 13, the advanced position of this plate being indicated in these figures in broken lines. Since the intermittent actuation of the charging device is controlled by the rotary movement of the block 24 and associated parts connected with the shaft 8, it will be apparent that the actuation of the charging device may be accurately synchronized with the movement of the dies to effect an accurate charging of the latter.

The elevation and retraction of the die elements 34 controlled by the master valve 38 as previously described may be further regulated as to the speed of the elevating and retractive movements through the medium of a needle valve shown in Fig. 19, which is connected in the pipe 83 through which the motivating fluid is conducted to the cylinders 12. This valve comprises a manually adjustable valve element 239 by means of which the flow of fluid to the master valve 38 from the source may be controlled and accurately regulated. A similar valve (not shown) may be placed in the discharge line 84 to regulate and control the piston speed by back pressure on the discharge. The timing of the die actuation with regard to the cyclic movement may be regulated by adjustment of the plate 43 about the axis of the shaft 8, for which adjustment provision is made as previously set forth in the slotted openings for the bolts 44. It will be apparent that adjustment of the plate 43 as described will also effect an angular adjustment of the relatively fixed elements of the master valve 38 comprising the sleeve 39 and the valve elements 52 and 53.

Means is also provided as illustrated in Fig. 3 for electrically heating the dies and for maintaining them at a proper temperature for the molding operation. This device comprises a pair of contact elements 241 and 242 which are connected to the heating circuit and which extend through the cover 7 of the housing 5 to respectively contact the metallic rings 243 and 244 mounted at the top of the die block 24. From these rings, wires pass to heating elements 245 inserted in the metallic block 24, and these elements conductively heat the block and the die elements held therein to the desired temperature.

It is believed that the operation of the mechanism will be apparent from the foregoing description.

I claim:

1. In a molding machine, the combination with a frame and a housing supported thereby, of a mobile die block mounted in said housing, and relatively movable coacting male and female die elements carried by said block, means for effecting a movement of said block carrying the die elements over a predetermined cyclic path, means for relatively moving the die elements in synchronism with the movement of the block to periodically bring together and separate said elements, and means operative automatically and intermittently to charge the female die at a given position in its cyclic path with a measured quantity of a molding composition, said means in operative position projecting through an opening in said housing and being formed as a unit comprising a hopper, means for transferring the said composition from the hopper to the die, mechanism for actuating said transfer means, and a bracket forming a common support for said hopper, transfer means and actuating mechanism, means on said frame forming a vertical pivot support for said bracket upon which said bracket may be swung horizontally between the said operative position and a retracted position affording access both to the said charging mechanism and, through said housing opening, to the dies, and means for releasably locking said charging unit in the operative position.

2. In a molding machine, the combination with a mobile die block, of relatively movable coacting male and female die elements carried by said block, means for effecting a continuous movement of said block carrying the die elements over a predetermined cyclic path, means for relatively moving the die elements in synchronism with the movement of the block to periodically bring together and separate said elements, means operative intermittently and in synchronism with said last-named means for depositing in the female die element at a given position in its cyclic path a measured quantity of a molding composition, said male element being formed so that an article molded between the die elements will adhere to the male element when the elements are separated, means for automatically stripping the molded article from the male die element at another position in said path, said stripping means comprising a rotary element positioned with its periphery adjacent the path of said male element so as to engage a molded article adhering to the latter element and to effect a rotary movement of said article with respect to the male element, and means operative upon the molded article in advance of said rotary element for twisting and thereby loosening the molded article with respect to and on the male die element.

3. In a molding machine, the combination with a mobile die block, of relatively movable coacting male and female die elements carried by said block, means for effecting a continuous movement of said block carrying the die elements over a predetermined cyclic path, means for relatively moving the die elements in synchronism with the movement of the block to periodically bring together and separate said elements, means operative intermittently and in synchronism with said last-named means for depositing in the female die element at a given position in its cyclic path a measured quantity of a molding composition, said male element being formed so that an article molded between the die elements will adhere to the male element when the elements are separated, and means for automatically stripping the molded article from the male die element at another position in said path, said stripping means comprising a rotary element positioned with its periphery adjacent the path of said male element so as to engage a molded article adhering to the latter element and to effect a rotary movement of said article with respect to the male element, and means operative upon the molded article in advance of said rotary element for twisting and thereby loosening the molded article with respect to and on the male die element, said last-named means comprising a pawl located normally in the path of said male die element for engagement with the molded article carried by the latter and being resiliently mounted for displacement from said path by contact with the molded article as the latter advances with the die, and means whereby said displacement effects a rotary movement of the pawl turning the molded article on the die.

4. In a molding machine, the combination with a mobile die block, of relatively movable coacting male and female die elements carried by said block, means for effecting a continuous movement of said block carrying the die elements over a predetermined cyclic path, means for relatively moving the die elements in synchronism with the movement of the block to periodically bring together and separate said elements, means operative intermittently and in synchronism with said last-named means for depositing in the female die element at a given position in its cyclic path a measured quantity of a molding composition, said male element being formed so that an article molded between the die elements will adhere to the male element when said elements are separated, and means for automatically stripping the molded article from the male die element at another position in said path, said stripping means comprising a rotary element positioned with its periphery adjacent the path of said male element so as to engage a molded article adhering to the latter element and to effect a rotary movement of said article with respect to the male element, and means operative upon the molded article in advance of said rotary element for twisting and thereby loosening the molded article with respect to and on the male die element, said last-named means comprising an arm resiliently mounted for movement toward and from the path of said male die element, a pawl element pivotally mounted on said arm and projecting into the path of said male die element and adapted to engage the molded article carried thereby, resilient means tending to hold the pawl in the path of said molded article, said pawl being adapted to be turned on its pivot against the pressure of said spring by movement of the molded article with the die and to thereby exert upon said article a turning force loosening the article on the die.

5. In a molding machine, the combination with a mobile die block, of relatively movable coacting male and female die elements carried by said block, means for effecting a continuous movement of said block carrying the die elements over a predetermined cyclic path, means for relatively moving the die elements in synchronism with the movement of the block to periodically bring together and separate said elements, means operative automatically and intermittently to deposit a predetermined measured quantity of a molding composition in the female die at a given position in its cyclic path, said male die element being formed so that an article molded between the die elements will adhere to the male element when the elements are separated, and means for automatically stripping the molded article from the male die element at another position in said path, said means comprising a rotary element mounted with its periphery adjoining the path of the male die element for engagement with a molded article adhering to the latter, and means for rapidly rotating said element in frictional contact with the molded article to thereby rotate said article with respect to and to release the said article from the male die element.

6. In a molding machine, the combination with a mobile die block, of coacting male and female die elements carried by said block, said female element being adapted to be elevated into coactive position with respect to said male element and to be retracted to a relatively depressed position, a chute projecting into the space below the path of said male elements for reception of molded articles stripped from the latter, said chute lying in the path of said female elements when the latter are in the elevated position but above the path of said female elements when the latter are depressed, motor means for effecting a continuous movement of said block carrying the die elements over a predetermined cyclic path, means operative in synchronism with the movement of the block for elevating and depressing the female die element and operative normally to move said female element to the depressed position as it approaches said chute, and means positioned in advance of said chute and operative by engagement thereof with the female element for interrupting the movement of said die block in the event that the female element in approaching the chute fails to move to the depressed position.

7. In a molding machine, the combination with a mobile die block, of coacting male and female die elements carried by said block, said female element being adapted to be elevated into coactive position with respect to said male element and to be retracted to a relatively depressed position, a chute projecting into the space below the path of said male elements for reception of molded articles stripped from the latter, said chute lying in the path of said female elements when the latter are in the elevated position but above the path of said female elements when the latter are depressed, motor means for effecting a continuous movement of said block carrying the die elements over a predetermined cyclic path, means operative in synchronism with the movement of the block for elevating and depressing the female die element and operative normally to move said female element to the depressed position as it approaches said chute, and means positioned in advance of said chute and operative by engagement thereof with the female element for interrupting the movement of said die block in the event that the female element in approaching the chute fails to move to the depressed position, said interrupting means comprising a clutch normally connecting the block with said driving means, and a clutch-actuating element positioned in the path of the female die when the latter is in the elevated position but above the path of the female die when the latter is in the depressed position and operative when engaged by said female die to release said clutch.

8. In a molding machine, the combination with a mobile die block, of a plurality of sets of relatively movable coacting male and female die elements carried by said block, means for effecting a movement of said block carrying the die elements over a predetermined cyclic path, an hydraulic mechanism for relatively moving the die elements of each set to close and subsequently open the die, and a master valve operating in synchronism with the movement of the die block to actuate said mechanisms at predetermined positions in said cyclic path, said valve comprising means for momentarily interrupting the flow of actuating fluid to the respective mechanisms in the closing movement of said elements to permit the escape of gases from molding composition confined in said die prior to the final closing of the latter.

JOHN LAUTERBACH.